United States Patent [19]

Crnojevich et al.

[11] Patent Number: 4,497,659

[45] Date of Patent: Feb. 5, 1985

[54] PRODUCTION OF METALS WITH LOW SELENIUM CONTENTS

[75] Inventors: Ranko Crnojevich, Gretna; Edward I. Wiewiorowski, New Orleans; Peter H. Yu, Harvey, all of La.

[73] Assignee: Amax Inc., Greenwich, Conn.

[21] Appl. No.: 524,707

[22] Filed: Aug. 19, 1983

[51] Int. Cl.³ .................. C01B 19/02; C22B 23/04
[52] U.S. Cl. ........................................ 75/109; 423/510
[58] Field of Search ............ 423/510; 75/0.5 A, 97 R, 75/109

[56] References Cited

U.S. PATENT DOCUMENTS 3,130,012  4/1964  Prater et al. ................... 423/510
4,405,464  9/1983  Baldwin et al. .................. 75/109

Primary Examiner—Howard S. Williams
Attorney, Agent, or Firm—Michael A. Ciomek

[57] ABSTRACT

Selenium is precipitated from solutions containing at least one metal selected from the group consisting of nickel, cobalt, copper, iron, zinc, manganese, magnesium, chromium and cadmium by adding chromous sulfate to the solution to precipitate selenium therefrom.

16 Claims, No Drawings

PRODUCTION OF METALS WITH LOW SELENIUM CONTENTS

THEORY OF THE INVENTION

The present invention relates to hydrometallurgy, and more particularly to the removal of selenium from metal-containing solutions.

BACKGROUND OF THE INVENTION

Many uses of metals require high purity. This is particularly true when metallic nickel is used in the production of superalloys. For example, sulfur in amounts greater than 50 parts per million can induce hot shortness in super alloys during hot working. It has also been established that the metalloid elements including, but not restricted to bismuth, lead, tellurium and to a lesser extent selenium, lower the ductility of super alloys in short time, elevated temperature tensile tests and in creep-rupture tests. Metallic nickel can be produced by electrorefining, electrowinning, carbonyl techniques and precipitating metallic nickel with a reducing gas from aqueous solutions. The first three of these processes generally produce a refined nickel product that contains less than 10 ppm selenium. Metallic nickel precipitated from aqueous solutions contains higher selenium concentration. It is advantageous to precipitate from aqueous solutions nickel having selenium contents comparable or lower than nickel produced by the other processes.

Some selenium is removed by partial volatilization during intermediate pyrometallurgical treatments. Selenium is also partially removed from aqueous solutions by coprecipitation with iron hydroxide, e.g., when iron is hydrolyzed under oxidizing conditions at temperatures in excess of 200° C. or when iron is hydrolyzed from solutions having a pH range between about 4 and 6. Some tetravalent selenium is further removed by cementation with metallic copper at moderate temperatures and with metallic nickel at temperatures above about 100° C.

These known processes for removing selenium from nickel solutions are costly, only partially effective or inapplicable. For example, those processes that require the use of temperatures of above 100° C. are frequently commercially unattractive because such reactions require the use of pressurized vessels in a large production stream, can entail the loss of nickel from solution or are effective in removing only selenium that is present in the tetravalent state. These known processes which rely on the coprecipitation of selenium with hydrolyzed ferric hydroxide or other hydroxides are not applicable to the treatment of pure nickel solutions because either these solutions do not contain the coprecipitating compound or are effective in only removing tetravalent selenium.

Recently, a process was described in U.S. Pat. No. 4,214,900 for removing selenium from solution by treating the solution with a semi-metallic compound containing a chromous compound. This process is effective in lowering the selenium content in solution, but the production of the semi-metallic compound is expensive.

A process for removing both tetravalent and hexavalent selenium from metal solutions under moderate operating conditions has now been discovered.

BRIEF DESCRIPTION OF THE INVENTION

Broadly stated, the present invention provides a process for precipitating selenium from a solution of at least one metal selected from the group consisting of cobalt, copper, nickel, iron, zinc and cadmium. The process comprises adding chromous sulfate to the solution to precipitate selenium therefrom.

DETAILED DESCRIPTION OF THE INVENTION

Aqueous solutions of at least one nonferrous metal selected from the group consisting of cobalt, copper, nickel, iron, zinc, manganese, magnesium, chromium and cadmium, can be treated for selenium removal by the process of the present invention. However, the process will be described in conjunction with the treatment of nickel-containing solution in order to facilitate the description thereof. Many nickel containing solutions can be treated by the process in accordance with the present invention. Thus, nickel chloride, nickel sulfate, nickel nitrate and nickel ammine sulfate solutions can be treated to remove selenium by the process in accordance with the present invention. Nickel sulfate solutions are most often treated to precipitate selenium. Nickel solutions that can be treated will generally have nickel concentrations between about 1 gpl and about 120 gpl and between about 2 ppm and 25 ppm, or even 100 ppm, selenium, and most often between about 5 ppm and about 15 ppm selenium. Although the nickel solutions can have a wide range of pH values, it is advantageous to maintain the pH value between about 1 and about 10, when nickel is present as ammine nickel and advantageously between about 4.0 and about 6.5, and most advantageously between about 4.5 and about 6.

Selenium is removed from nickel solutions by contacting the solution with chromous sulfate solution containing normally between about 5 and about 110 gpl of the chromous ion, $Cr^{++}$. The chromous sulfate solution is prepared by dissolution of metallic chromium, chunks or powder, in sulfuric acid solution normally containing between about 10 and about 500 gpl sulfuric acid. The dissolution is advantageously conducted under non-oxidizing conditions, such as under a blanket of inert gas, like nitrogen, and/or organic liquid not miscible with water, like mineral oil, to insure the production of chromous sulfate. A temperature between about 50° C. and about 102° C. is normally maintained during the dissolution. The chromous solution should preferentially be used as soon as possible after it was prepared as it slowly oxidizes. It can, however, be stored up to several days under a blanket of inert gas and/or organic liquid.

As noted hereinbefore, the chromous sulfate can be used for treating most nickel solutions. As an example, the precipitant can be used for purifying nickel solutions produced by a sulfuric acid leaching operation in which the first stage is an atmospheric leach and followed by superatmospheric leaches. Nickel copper matte is atmospherially leached with an acidic sulfate solution containing nickel and substantial amounts of copper to dissolve a substantial part of the nickel contained in the matte while cementing copper from solution and consuming free acid contained in the leaching solution to produce a substantially purified nickel sulfate solution and a residue containing cement copper, hydroxides precipitated during the leaching operation, and unleached material. The residue is subjected to superatmospheric leaching with aeration with an acidic solution containing substantial amounts of free acid to dissolve most of the nickel and copper remaining in the residue. The residue from the first stage pressure leaching operation is then subjected to more severe acid leaching to produce a copper sulfate solution containing any of the undissolved nickel values in the residue from the first stage pressure leaching operation. The pregnant solution from the second stage pressure leaching operation is sent to a tank house where copper is electrowon from the solution and the spent electrolyte is then recycled to the atmospheric leach and the pressure leaching operation. Selenium is preferentially removed from the nickel solution after the atmospheric leaching operation is completed, because the atmospheric leach consumes any excess acid, thereby automatically adjusting the pH value of the solution within the aforedescribed ranges and reduces most, if not all, multivalent metal ions to their lowest oxidation state.

Selenium removal can be conducted at ambient pressures with mild agitation at temperatures from room temperature to the boiling point of the solution. Agitation should be employed in such a manner as to minimize aspiration of air which can oxidize the chromous sulfate thereby consuming a portion of the chromous sulfate that would otherwise be consumed in precipitating selenium. Advantageously, the solution, after the addition of chromous sulfate, is agitated under protective atmosphere or under a cover of a non-oxidizing water immiscible organic liquid. For kinetic considerations and practicality, the process temperature is advantageously between about 60° C. and about 90° C. Selenium removal can be completed in as short a time as 15 to 30 minutes, normally about one hour, but longer times are not detrimental.

The concentrations of more readily reducible metal ions (i.e., ferric, cupric, cobaltic, etc.) should be minimized as much as possible, preferably below 0.5 gpl of each species. The presence of these ions has a detrimental effect on the selenium removal. If the solution to be treated contains more than 0.5 gpl of any of the more reducible metal ions, the solution can be pretreated with other less expensive reducing reagent such as organic reductants (e.g., methanol or ethanol), hydrogen, sulfur dioxide or even powdered metals to reduce the metal ions to their lowest oxidation state.

Selenium can be removed from nickel solutions having pH values between about 1 and 10 but is advantageously carried out in nickel solutions that are only slightly acidic, i.e. having pH values between about 2.5 and about 6.5. The amount of the chromous compound added to the nickel solution is mainly dependent upon the amount of selenium contained in the solution and to a lesser extent on other process variables like temperature, reaction time, pH value, the oxidation state of the selenium, etc. At selenium concentrations between about 1 part per million and about 10 parts per million, about 50 to 100 ppm $Cr^{++}$ is required per one ppm of selenium to be removed. For nickel solutions containing more than about 10 ppm the dosage requirement of the chromous sulfate solution is decreased to between about 45 and about 75 ppm $Cr^{++}$ per ppm selenium.

Because the amount of the chromous sulfate required is dependent not only on the amount of selenium in solution but other process variables, it is advantageous to ascertain by tests that level of precipitant additions that will lower the selenium content to the desired levels.

In an advantageous embodiment of the present invention, a previously precipitated material is added to the metal solution prior to, during, or after the chromous sulfate addition to promote the precipitation of selenium. The use of a previously precipitated material, other factors remaining constant, increases the rate of selenium precipitation, provides lower final selenium concentrations, and lowers the amount of chromous sulfate required for a given degree of selenium removal.

In order to give those skilled in the area a better understanding of the advantages flowing from the present invention, the following illustrative examples are given:

EXAMPLE 1

A chromous sulfate solution was prepared by adding 44 grams chromium metal chunks to a sulfuric acid solution containing 150 gpl $H_2SO_4$/liter. The reaction was discontinued when the concentration of $Cr^{++}$ was 33 gpl.

A nickel sulfate leach solution having a pH value of 5.4 and containing 82 gpl Ni, 1.2 gpl Co, 2 ppm Cu, 1 ppm Fe and 11 ppm Se (over 95% in the hexavalent state) was treated with varying amounts of chromous sulfate to show how the amount of chromous sulfate affects the precipitation of selenium. The tests were carried out in an open vessel exposed to air with moderate agitation at 70° C. with a retention time of 15 minutes.

TABLE 1

| | Effect of Amount of Chromous Sulfate | | | |
|---|---|---|---|---|
| | Chromous Sulfate Dosage | | Final Solution | |
| Test No. | gpl $Cr^{++}$ | ppm $Cr^{++}$/ppm Se | pH | ppm Se |
| 1 | 0 | 0 | 5.4 | 11.0 |
| 2 | 0.25 | 23 | 5.2 | 6.6 |
| 3 | 0.50 | 45 | 4.7 | 0.6 |
| 4 | 0.75 | 68 | 4.2 | 0.4 |
| 5 | 1.0 | 91 | 4.2 | 0.2 |

EXAMPLE 2

The detrimental effect of air on selenium removal by chromous solution is shown in Table 2. The chromous sulfate and nickel solutions were the same as used in Example I. Results from tests with mild agitation as compared to those from tests with aeration confirm, particularly at low rates of chromous sulfate addition, that aeration lowers the effectiveness of chromous sulfate in precipitating selenium. Aeration was provided by purging air through the nickel solution at the rates shown in Table 2.

TABLE 2

| Effect of Aeration Initial Se 11 ppm, Retention Time 15 Min., Temperature 70° C., Initial pH 5.3 | | | | |
|---|---|---|---|---|
| Aeration liter air/min./ | Chromous Sulfate Dosage | | Final Solution | |
| liter soln. | gpl $Cr^{++}$ | ppm Cr/ppm Se | pH | Se |
| 0 | 0.25 | 23 | 5.2 | 6.6 |
| 0 | 0.5 | 45 | 4.7 | 0.6 |
| 2 | 0.25 | 23 | 5.0 | 8.8 |
| 2 | 0.5 | 45 | 4.4 | 3.8 |

EXAMPLE 3

A solution containing 96 gpl Ni, 1.4 gpl Co, 12 ppm Cu, 2 ppm Fe, and 14 ppm Se was used in this series of tests. The kinetics of the selenium removal reaction are presented in Table 3. The results shown in Table 3 confirm that longer retention time are more effective in producing lower final selenium concentrations.

TABLE 3

Effect of Time
Initial Selenium Concentration 14 ppm Se,
Chromous Sulfate Dosage 0.5 gpl $Cr^{++}$
i.e. Initial Ratio of $Cr^{++}$ to Se = 35
Temperature 70° C., open vessel, initial pH 5.3

| Retention Time Min. | Final Solution pH | Se ppm | Conversion (% of Selenium Precipitated) |
|---|---|---|---|
| 0 | 5.5 | 14 | — |
| 1 | — | 10.4 | 26 |
| 2 | — | 9.2 | 34 |
| 4 | — | 7.4 | 47 |
| 6 | — | 6.2 | 56 |
| 10 | — | 5.8 | 59 |
| 15 | — | 4.8 | 64 |
| 30 | — | 4.0 | 71 |
| 60 | 4.4 | 3.8 | 73 |

EXAMPLE 4

The effect of initial pH of the system is illustrated in Table 4. The solutions as described in Example 3 were used in this series of tests. The results shown in Table 4 confirm that selenium removal is more complete for solutions having moderately high initial pH values, i.e. less acidic solutions.

TABLE 4

Effect of pH
Initial Selenium Concentration 14 ppm Se
Chromous Sulfate Dosage 0.5 gpl $Cr^{++}$
i.e. Initial $Cr^{++}$/Se Ratio = 35, Retention
Time 30 Min., Temperature 70° C., Open Vessel

| pH Initial/Final | Final Se Conc. ppm Se | Conversion (% of Selenium Precipitated) |
|---|---|---|
| 4.0  3.4 | 11.6 | 17 |
| 5.3  4.4 | 4.0 | 71 |
| 6.0  6.0 | 3.4 | 76 |
| 6.5  6.4 | 2.8 | 80 |

EXAMPLE 5

This example confirms that the reaction can be successfully carried out in a relatively wide range of temperatures. It is, however, advantageous to maintain the solution at a temperature of at least about 70° C. The solutions tested were the same as described in Examples 3 and 4. The results in in Table 5 confirm that for equal retention times higher solution temperatures promote selenium precipitation; i.e., higher solution temperatures permit shorter retention times or provide lower selenium concentrations for similar retention times.

TABLE 5

Effect of Temperature
Initial Selenium Concentration - 14 ppm
Chromous Sulfate Dosage - 0.5 gpl $Cr^{++}$
Initial $Cr^{++}$/Se Ratio = 35
Initial pH - 5.3, Retention Time - 30 min.
Open Vessel

| Temperature °C. | Final Se Conc. ppm Se | Conversion (% of Se Precipitated) |
|---|---|---|
| 50 | 4.6 | 67 |
| 70 | 4.0 | 71 |
| 90 | 2.5 | 82 |

EXAMPLE 6

This example confirms that recycling of the precipitated solids lowers the amount of chromous sulfate that is used. Solids originating from a test with a $Cr^{++}$ dosage corresponding to 0.75 gpl $Cr^{++}$ were, in the form of a wet cake (64% moisture) introduced into a fresh solution which was simultaneously treated with only 0.5 gpl $Cr^{++}$. A comparative test without use of recycled solids with the same 0.5 gpl $Cr^{++}$ addition was also run. Solids from the first test "A" were added to Test B solution to provide a slurry containing about 5 gpl solids. The test solution contained 84 gpl Ni, 1.3 gpl Co, 2 ppm Fe and 10.5 ppm Se. The results for the tests, including the production of solids recycle are shown in Table 6. The results shown in Table 6 show that solids recycle enhances selenium precipitation (as opposed to no solids recycle) even when lower amounts of chromous sulfate are employed.

TABLE 6

Recycling of Solids
Composition of recycled solids from Test "A"
25% Ni, 12% Cr, 0.1–0.15% Se, 9.5% S.
Initial Selenium Concentration - 10.5 ppm Se
Initial pH - 5.5 Temperature - 70° C., No Aeration, Open Vessel

| Test | Solids Recycle | Chromous Sulfate Dosage gpl $Cr^{++}$ | $Cr^{++}$/Se | Final Selenium Concentration ppm Se | Conversion (% Selenium Precipitated) |
|---|---|---|---|---|---|
| A. Solids Generation | No | 0.75 | 71 | 1.0 | 90 |
| B. Test w/Solids Recycled from Test #1 | Yes | 0.50 | 48 | <0.2 | >98 |
| C. Comparison Test with No Solids | No | 0.50 | 48 | 2.6 | 75 |

EXAMPLE 7

This example demonstrates the continuous removal of selenium from a nickel sulfate solution. The chromous sulfate solution was continuously generated in a column filled with chromium metal. Sulfuric acid solution containing about 100 gpl $H_2SO_4$ was pumped upwards through the column. The chromous sulfate solution effluent from the column had a pH of 3.0 and contained 44 gpl $Cr^{++}$. This chromous sulfate solution was dosed continuously at a rate of 1 ml/min. into a covered reactor tank containing nickel sulfate solution containing 84 gpl Ni, 1.3 gpl Co, 2 ppm Cu, 2 ppm Fe and 10.5 ppm Se. Nickel sulfate solution was fed in at a rate of 64 ml/min. and the product solution discharged from the reactor at a feed rate of 65 ml/min. The solution volume in the reactor was maintained at 2.8 liter; thus, the residence time in the reactor was 42 min. The $Cr^{++}$ concentration in the reactor tank was 0.67 gpl $Cr^{++}$ corresponding to a $Cr^{++}/Se$ ratio of 63. A temperature of 80° C. was maintained during the test. The product solution has a pH of 4.8 and a selenium concentration of 0.8 ppm Se.

EXAMPLE 8

Selenium was removed from a nickel ammine sulfate solution having a pH value of about 9.0 and containing 100 gpl $(NH_4)_2SO_4$, 71 gpl Ni, 1.1 gpl Co, 1 ppm Cu, 1 ppm Fe and 8.8 ppm Se. The $NH_3$ to Ni ratio was 2. A dosage of 0.5 gpl $Cr^{++}$ corresponding to an initial Cr/Se ratio of 57 was employed in the test. The test was carried out with moderate agitation in an open beaker at a temperature of 70° C. providing the 60 min. reaction time. The final selenium concentration in the nickel ammine sulfate solution was 0.2 ppm Se.

EXAMPLE 9

This Example shows the use of chromous sulfate for selenium removal from a copper electrowinning tankhouse solution containing 65 gpl Cu, 45.3 gpl Ni and, initially, 40.6 ppm Se. The test results are shown in Table 7.

TABLE 7

Selenium Removal from Copper Leach Solution
Initial Selenium Concentration - 40.6 ppm Se
Copper Concentration - 65.0 gpl Cu
Nickel Concentration - 45.3 gpl Ni
pH - 1.0
Temperature - 70° C.
Retention Time - 60 Min.
Open Vessel

| Chromous Sulfate Dosage | | Final Selenium Concentration | Conversion (% Selenium |
|---|---|---|---|
| gpl $Cr^{++}$ | $Cr^{++}/Se$ | ppm Se | Precipitated) |
| 1 | 25 | 31.2 | 23 |
| 3 | 74 | 23.4 | 42 |
| 5 | 123 | 13.2 | 67 |

EXAMPLE 10

This Example demonstrates the precipitation of selenium from solutions containing anions other than sulfate anions. Selenium was precipitated from a nickel chloride solution having a pH value of about 2.0 and containing 60 gpl Ni and 10.8 ppm Se. The test was carried out with a chromous sulfate dosage of $Cr^{++}/Se=93$, i.e., a chromous sulfate concentration of about 1 gpl $Cr^{++}$. The retention time was 60 min. at 70° C. and a final pH of about 2.1. The final selenium concentration was 6.8.

EXAMPLE 11

To illustrate the wide applicability of chromous sulfate solution as selenium removal agent, tests with aqueous sulfate solutions of other metals were carried out. The results are presented in Table 8 below:

TABLE 8

Selenium Recovery from Sulfate Solutions of Various Metals
Temperature - 70° C.
Retention Time - 60 Min.
Chromous Sulfate Addition 1 gpl $Cr^{++}$

| Metal Ion | Concentration | pH Initial | pH Final | Se Conc., ppm Se Initial | Se Conc., ppm Se Final | Conversion (% Selenium Precipitated) |
|---|---|---|---|---|---|---|
| Cobaltous | 64 gpl $Co^{++}$ | 5.0 | 4.7 | 16.0 | 5.0 | 69 |
| Magnesium | 60 gpl $Mg^{++}$ | 3.0 | 2.9 | 12.0 | 6.5 | 46 |
| Manganous | 60 gpl $Mn^{++}$ | 2.8 | 2.7 | 12.5 | 5.1 | 69 |
| Cadmium | 60 gpl $Cd^{++}$ | 3.7 | 3.4 | 12.3 | 2.4 | 80 |
| Chromic | 50 gpl $Cr^{++}$ | 1.1 | 1.1 | 11.8 | 1.0 | 92 |
| Ferrous | 60 gpl $Fe^{++}$ | 2.6 | 2.6 | 8.8 | 1.0 | 89 |
| Zinc | 60 gpl $Zn^{++}$ | 1.0 | 1.0 | 12.1 | 1.0 | 92 |

Although the present invention has been described in conjunction with preferred embodiments, it is to be understood that modifications and variations may be resorted to without departing from the scope of the invention, as those skilled in the art will readily understand. Such modifications and variations are considered to be within the purview and scope of the invention and appended claims.

We claim:

1. A process for precipitating selenium from an aqueous solution of at least one metal selected from the group consisting of cobalt, copper, nickel, iron, zinc and cadmium, which comprises adding chromous sulfate to the solution to precipitate selenium therefrom.

2. The process as described in claim 1 wherein the aqueous solution contains a metal in a higher oxidation state and the solution is pretreated with a reducing reagent to lower the amount of the metal ion in the high oxidation state to less than about 0.5 gpl.

3. The process as described in claim 1 wherein the solution is a nickel solution in which nickel is present as nickel or nickel ammine.

4. The process as described in claim 3 wherein the solution has a pH value between about 1 and about 10.

5. The process as described in claim 4 wherein the solution has a pH value between about 2.5 and about 6.5.

6. The process as described in claim 5 wherein the solution has an initial selenium concentration between about 1 ppm and between about 10 ppm and about 50 ppm to about 100 ppm $Cr^{++}$ per 1 ppm of selenium to be precipitated is added to the solution.

7. The process as described in claim 5 where the initial nickel solution contains more than about 10 ppm selenium and chromous sulfate is added to the solution to provide $Cr^{++}$ concentrations between about 45 ppm and about 75 ppm.

8. The process as described in claim 5 wherein the solution is maintained at a temperature between about 60° C. and about 90° C.

9. The process as described in claim 2 wherein the reducing agent is selected from the group consisting of organic reductants, hydrogen, sulfur dioxide or powdered metals.

10. The process as described in claim 1 wherein previously precipitated material is added to the solution prior to or during the addition of chromous sulfate to promote selenium precipitation.

11. A process for precipitating selenium from an aqueous solution containing nickel, or nickel ammine ions and at least one ion selected from the group consisting of chloride, sulfate and nitrate, and having a nickel concentration between about 1 gpl and about 120 gpl and a selenium concentration between about 1 ppm and about 100 ppm and having a pH value between about 1 and about 10 which comprises adding chromous sulfate to the aqueous solution to provide a $Cr^{++}$ concentration between about 50 ppm and about 100 ppm for each ppm of selenium content for initial selenium concentrations between about 1 ppm and about 10 ppm and between about 45 ppm and about 75 ppm $Cr^{++}$ for each ppm selenium for initial selenium concentrations in excess of about 10 ppm to precipitate selenium from the aqueous solution.

12. The process as described in claim 11 wherein the aqueous solution contains a metal in a higher oxidation state, and the solution is pretreated with a reducing reagent to lower the amount of the metal ion in the high oxidation state to less than about 0.5 gpl. which nickel is present as nickel or nickel ammine.

13. The process as described in claim 12 wherein the solution has a pH value between about 1 and about 10.

14. The process as described in claim 13 wherein the solution is maintained at a temperature between about 60° C. and about 90° C.

15. The process as described in claim 12 wherein the reducing agent is selected from the group consisting of organic reductants, hydrogen, sulfur dioxide or powdered metals.

16. The process as described in claim 11 wherein precipitated material is recycled to the solution prior to or during the addition of chromous sulfate to promote selenium precipitation.

* * * * *